Patented July 20, 1943

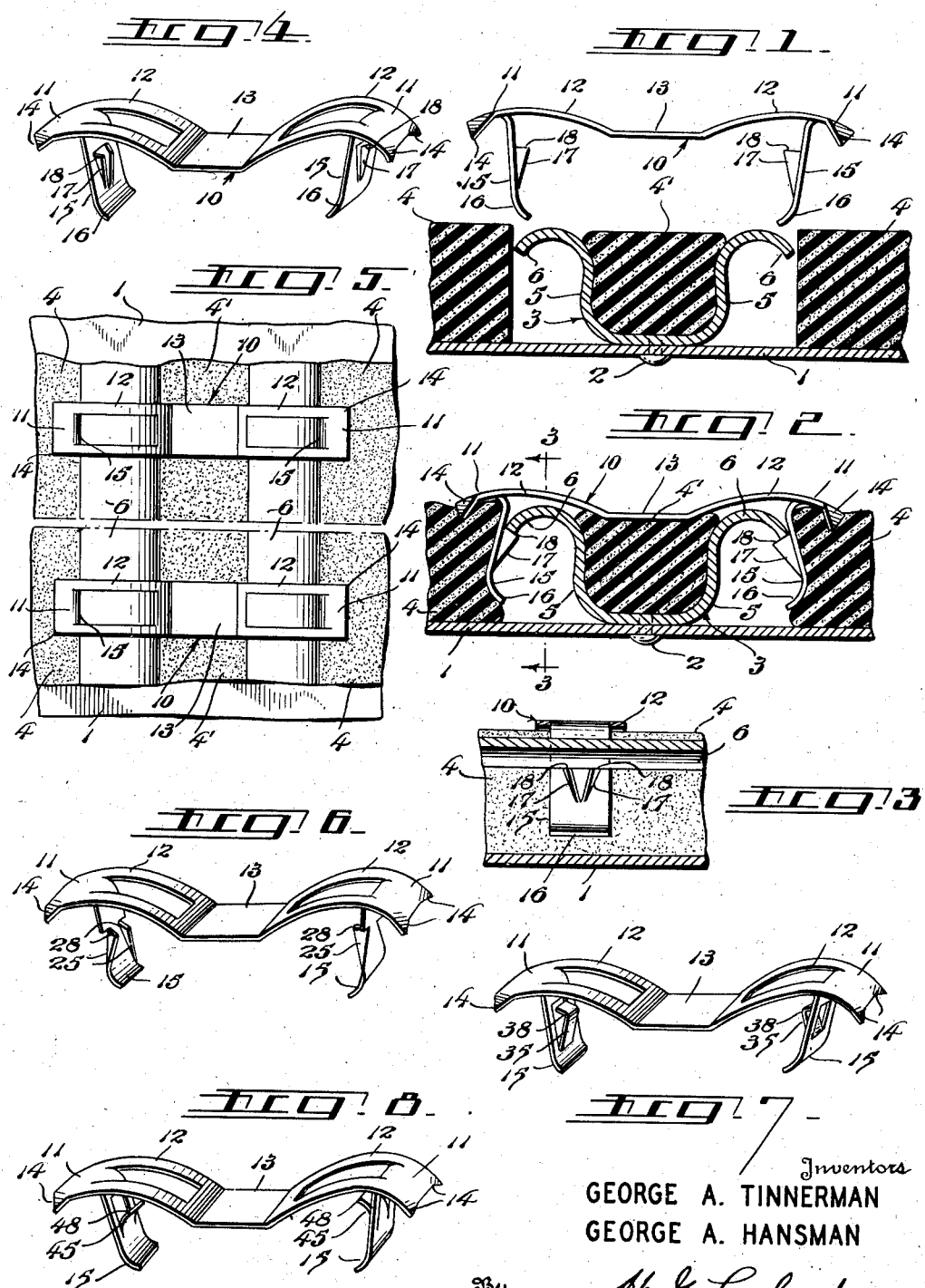

2,324,654

UNITED STATES PATENT OFFICE 2,324,654

WALL CONSTRUCTION

George A. Tinnerman and George A. Hansman, Cleveland, Ohio, assignors to Tinnerman Products, Inc., Cleveland, Ohio, a corporation of Ohio Application January 2, 1942, Serial No. 425,442

8 Claims. (Cl. 189—34)

This invention relates in general to an improved insulated wall construction which is particularly applicable to aircraft, and the like, while otherwise having a wide range and variety of uses as a construction of general utility in the fabrication of structures insulated against sound, heat, cold, etc.

More particularly, the invention is directed to improvements in insulated wall constructions of the general character comprising a wall member or skin defining a structural body such as, for example; the fuselage or wing of an aeroplane, or other building construction, and a relatively thick layer of soft, porous insulating material lining the interior of said wall member or skin and attached thereto by a new and novel fastening means which is strong, durable, light in weight and results in considerable savings in cost, time and labor in mass production methods of assembly.

In an aircraft construction, for example, former methods for holding the insulation providing the lining in a wing mounting for a bullet-proof gas tank required the use of special cement or similar mastic coating the application of which, in any event, was a time consuming procedure and involved an entirely inordinate expense for labor and other costs of manufacture. In accordance with the present invention there is provided in such an installation, a fastening arrangement by which it is unnecessary to change or otherwise modify the general form of insulated wall structure in employing an improved form of clip fastening means which minimizes or entirely dispenses with the use of any special cement or similar mastic coating for securing the insulation to the wall member in a manner making for the greatest speed and mass production economies in the manufacture of various constructions of this general character.

Another object of the invention is to provide an insulated wall structure comprising panel-like wall members joined by riveting, welding, or the like, to rigid frame members or ribs, and insulating material secured in said wall structure by clip fastening devices designed for cooperative fastening engagement with said rigid frame members or ribs.

A further object of the invention contemplates in such an installation a clip fastening device adapted for easy and quick snap fastening action to applied position holding the insulating material firmly and rigidly in the wall structure in a manner to withstand extreme conditions of vibratory motion, shock, and the like.

Still another object of the invention is the provision of a clip fastener of this character having snap fastening means which may be applied to fastening position in a minimum of time and effort with the body of the fastener having no projecting parts and lying substantially flush with the insulating material in such fastening position to define a wall surface having a substantially smooth, even contour against which an assocoiated member may be mounted in close, superposed or juxtaposed relation.

A further more specific object of the invention contemplates various forms of a clip fastening device of the kind described having a simple, inexpensive construction which lends itself to economical quantity production while otherwise being adapted to provide a strong, durable and reliable fastening installation at relatively low cost.

With the foregoing and other objects in view, further objects and advantages and other new and useful features in the construction, arrangement and general combination of parts of the invention will be readily apparent to those skilled in the art as the description proceeds with reference to the accompanying drawing, for purposes of illustration but not of limitation, in which like reference characters designate like parts, and in which:

Fig. 1 is a sectional view of an assembly embodying the invention and showing the improved clip fastener in position to be applied to secure the assembly;

Fig. 2 is a similar view showing the clip fastener in finally applied fastening position;

Fig. 3 is a sectional view on line 3—3 of Fig. 2 looking in the direction of the arrows;

Fig. 4 is a perspective view of the clip fastener per se;

Fig. 5 is an elevation of a portion of a completed wall structure in accordance with the invention;

Figs. 6, 7 and 8 are perspective views of various modified forms of clip fasteners.

Referring now, more particularly, to the drawing, the numeral 1, Figs. 1, 2 and 5, designates generally the exterior wall member of any appropriate building structure or a portion of the outer skin defining, for example, the fuselage or wing body of an aeroplane. Said outer skin or wall member 1 is usually composed of lightweight sheet metal panel members which are held together in the desired construction by securing the same to spaced frame members or ribs, as by rivets 2, welding, or the like. On the rearward side of said wall member or outer skin 1 thus provided, the spaced frame members or ribs 3 define relatively small panel-like areas which are admirably suited for receiving layers or pads 4 of insulation or similar material which forms an inner lining on the wall member or outer skin 1.

In the present example, the frame members or ribs 3 are of rigid, generally channel-shaped formation comprising side walls 5 on either side of the base or bottom thereof which is secured by rivets 2, welding or equivalent means to the panels forming the outer skin or wall member 1 to support the same firmly and rigidly in the completed structure. The said side-walls of the ribs terminate in lateral flanges 6 having free edges bordering the panel-like areas receiving the layers or pads of insulating material 4, and accordingly, form an excellent means by which such insulating material may be secured easily and quickly by clip fastening devices in accordance with the invention in a manner to minimize and dispense with the use of any special cement or similar mastic coating.

The insulating material 4 in the form of pads, or the like, may be of any suitable soft porous composition in which the pores are disposed toward the interior of the structure. A common form of insulating material of this character is provided in pads of matted hair, or of fibres of wood, such as are marketed under the trade name Balsam-Wool, or of cotton, kapok, rubber, cork, jute or a mixture of any such or other similar material preferably of low density. A preferred commercial form of such insulating material is provided in pads of approximately one-inch thickness and weighing .15 to .30 pound per square foot. The insulating pads 4 otherwise are of a thickness approximating the distance the lateral flanges 6 of the ribs extend from rearward side of the wall member 1, such that the exposed faces of said pads lie more or less in a common plane with said flanges 6 and define an inner lining having a substantially smooth, uninterrupted surface conforming generally to the contour of the outer skin or wall member 1. To complete the lining uniformly in this manner, strips 4' of similar insulating material are arranged in the channels of the ribs or frame members between the side-wall 5 thereof substantially as shown in Fig. 1.

With the lining thus provided by the insulating pads 4 and intermediate strips 4', it is, of course, preferable that the same be held against the wall member or outer skin 1 in such manner that the vibrations of said wall member are uniformly dampened by being transmitted to the lining as a whole and not merely to localized areas thereof adjacent the wall member as would be the case if the insulating material were merely cemented to said wall member. In this respect, the clip fastening arrangement of the present invention is further advantageous in that the clips are designed to exert continuously effective pressure against the interior or exposed surface of said lining to clamp the same firmly and rigidly against the outer skin or wall member 1 in providing a compact, unitary wall structure which is not affected by sudden changes in temperature and is adapted to withstand the most severe conditions of vibratory motion, shock, etc., for the purposes intended.

As best seen in Fig. 4, a preferred form of clip fastener, designated generally 10, is a relatively simple, inexpensive article of manufacture which is admirably suited for quantity production at very low cost in that it may be provided from standard strip stock with practically no loss or waste of material. The fastener may be provided of any suitable sheet metal preferably of a spring metal nature such as spring-tempered metal or cold rolled metal having spring-like characteristics. In aircraft constructions, for example, the fasteners preferably are manufactured from aluminum material, such as 24 ST aluminum alloy, the size, thickness and finish of which is selected according to service requirements and the predetermined size of the parts secured.

The clip fasteners, of course, may be formed from sheet metal sections of various outlines but from the standpoint of most economical quantity production are best provided from generally rectangular sections severed from standard strip material and struck and formed to completion at a relatively high rate of production. The body or base of the fastener is defined by the sheet metal section itself and is so formed in the stamping operation as to provide generally bowed or cambered head portions 12 on either side of an intermediate connecting portion 13. Preferably anchoring means are provided on the fastener body as by the downwardly bent corner portions forming anchoring prongs 14, teeth or the like.

A leg or shank member 15 is struck and formed from each head portion 12 to depend therefrom in spaced relation to the adjacent extremity thereof thereby presenting an abutment 11 defining a part of the head portion and carrying said anchoring means in the form of prongs 14, or the like. The leg members 15 extend generally downwardly and inwardly from the fastener body with the free end portions thereof suitably curved to define rounded bearing surfaces 16. The leg members 15 thus form the shank of the clip and at least one, preferably both, are provided with securing or holding elements adapted for snap fastening engagement with the lateral flanges 6 on the ribs or frame members 3 in cooperation with the abutment and head portions 11, 12, to retain the clip in applied fastening position in the completed assembly, as presently to be described.

In a preferred construction, such securing elements are provided in the manner of cooperating substantially triangular tongues or flaps 17 defined by a generally T-shaped slit area in a leg or shank member 15 and bent to project inwardly out of the plane thereof such that the transverse upper edges of said tongues or flaps 17 define relatively sharp cam shoulders 18, with the adjoining longitudinal free edges thereof presenting inclined guide surfaces tapering from said shoulders 18 and merging into the plane of the leg member. Generally speaking, the shoulders 18 are provided on the leg members 15 a distance slightly less than necessary to engage the edges of the lateral flanges 6 with the end abutments 11 of the head portions 12 in engagement with the insulating material 4, whereupon such material may be compressed by said abutments in applying the clip to final fastening position to provide a firm, rigid, tight installation, as hereinafter more fully set forth.

It will be understood that as many clips as necessary are applied to the flanges 6 of the rib or frame member 3 at regular intervals and at suitably spaced points along which the insulating material extends in attached position, substantially as shown in Fig. 5. Said clips 10 are designed to be applied to substantially flush engagement with the exposed surface of said insulating material 4 under continuously effective spring force to provide the completed lining in which the insulating material is firmly and rigidly clamped to the wall member 1 in uniform relation rather than arranged merely to adhere thereto through the use of cement or similar mastic coating. A clip fastener is initially applied to the assembly as shown in Fig. 1 in a manner whereby the leading ends of the leg members 15 are passed over the edges of the lateral flanges 6 on the associated rib or frame member 3 with the fastener body transversely of and bridging the general channel-shaped formation of said rib or frame member. In this relation, the intermediate portion 13 of the fastener body is adapted to engage and compress the insulating strip 4' in the channel with the abutments 11 defined by the extremities of the head portions 12 adapted to engage the adjacent ends of the insulating pads 4.

The leg or shank members 15 depend resiliently from the fastener body, and accordingly, as the clip is advanced to applied fastening position as shown in Fig. 2, said leg members are spread as necessary for the free ends 16 thereof to clear the edges of the lateral flanges 6 and dispose the inclined guide edges of the tongues, flaps or similar holding elements 17 in contact with said flange edges. As the clip is further applied, said guide edges cause the leg members 15 to spread over the edges of flanges 6 as necessary for the shoulders 18 to assume the position substantially of cam shoulders adapted for easy and quick snap fastening action with the edges of said flanges 6. In the final application of the clip, pressure is exerted on the abutments 11 of the head portions 12 to compress the insulating material 4 and simultaneously force the cam shoulders 18 on the leg members into snap fastening engagement with the edges of the flanges 6 against the force of the rounded bearing surfaces 19 which engage the adjacent sides of the insulating pads 4 and compress the same to a conforming contour, thereby seating the leg members 15 in the most effective manner without likelihood of loosening or displacement. Thus the insulating strip 4' is compressed in the channel 3 by the intermediate connecting portion 13 of the clip while the abutments 11 defined by extremities of the head portions 12 compress the adjacent ends of the insulating pads 4 with the anchoring prongs 14 embedded therein to maintain the same firmly and rigidly in attached position. Upon release of pressure on the head portions 12 of the clip, the compressed insulation naturally tends to assume its normal condition and thus causes an axial drawing action on the leg members 15, thereby forcing the shoulders 18 thereon into positive locked fastening engagement with the edges of flanges 6 such that insulating material is clamped to the wall member in a tight, rigid, installation which is not subject to loosening or displacement incidental to vibratory motion, shock, and the like.

Preferably the shoulders 18 are designed substantially as cam shoulders adapted to ride over the corner edges of the flanges 6 to seat readily in positive abutting relation with said flange edges as shown in Figs. 2 and 3, under the contractive spring force of said leg members attempting to assume their initial untensioned relation, Fig. 1, while otherwise compensating for slight manufacturing variations and irregularities in the size and shape of the parts of the assembly in a manner to provide automatically for a positive locked fastening installation in the most effective manner. It will be appreciated, further, that the bowed or cambered configuration of the head portions 12 is such as to compensate for considerable tolerances in the insulating material in order to accommodate different thicknesses and to absorb any discrepancy in the final assembly of parts while otherwise providing for a more or less independent fastening action of one leg member irrespective of the other; and in this relation, the present invention fully contemplates any equivalent arrangement wherein there may be employed a pair of individual clips each having a single leg or shank member 15 designed for application and use substantially in the manner of that described.

Figs. 6-8 inclusive illustrate various clip devices similar to the fastener of the previously described embodiment of the invention but having modified forms of holding or securing elements provided on the leg or shank members 15. Thus, in Fig. 6, the leg members are provided with securing elements or shoulders along the edges thereof by means of transverse slits defining substantially triangular tongues or flap portions 25 which are bent inwardly in a manner whereby the upper edges thereof define cam shoulders 28 on the leg members of the clip designed for the same general application and use as that shown in Fig. 4.

The clip device of Fig. 7 has the securing elements or shoulders on the leg members thereof defined by longitudinally extending, yieldable spring arms 35 struck out from the respective leg members, substantially as shown, with the free end portion of a spring arm bent to define a cam shoulder 38 adjoining an inclined guide surface merging into the plane of the leg member. In Fig. 8, the securing elements are provided by similar yieldable spring arms 45 struck out from the respective leg members with the free end portions of said arms defining shoulders in the general form of flared lips adapted to snap past the edges of the lateral flanges 6 on the rib or frame members 3, Fig. 3, and engage a material portion of the underside of said flanges in positive locked abutting relation therewith, substantially as and for the purposes described with reference to the form of the invention shown in Figs. 1-5 inclusive.

Although the invention is described in connection with an insulated wall construction which is particularly useful in aircraft, it is to be understood that the invention is equally applicable to various other similar applications and uses in building constructions and the like within the broad general scope and basic teachings of the instant disclosure.

The clip fastener in any form preferably is constructed of relatively thin sheet metal, such as aluminum alloy, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means adapted for a long period of satisfactory service and use.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A wall construction comprising one or more panels or the like defining a wall member, a channel-shaped frame member or rib secured to the wall member and having lateral flanges spaced from said wall member, insulating material lining said wall member comprising portions extending from adjacent said rib on either side thereof and a strip portion in the channel of said rib, and a fastener comprising a sheet metal body defining spaced head portions including abutments engaging said lining material and strip, and shank elements provided from the material of said head portions and bent to project therefrom for snap fastening engagement with the edges of said lateral flanges on the rib to secure said insulating material to said wall member.

2. A wall construction comprising one or more panels or the like defining a wall member, a channel shaped frame or rib member secured to said wall member and terminating in outwardly projecting flanges, a layer of material lining said wall member comprising portions extending from adjacent said rib on either side thereof, and a fastener having heads engaging said portions of material and tongues projecting inwardly from said heads and having barbs on their inner faces for snap fastening engagement with the edges of said lateral flanges to secure said material to said wall member.

3. A wall construction comprising a wall member, a continuous channel-shaped rib secured to the wall member and having its projecting portions turned outwardly to provide lateral flanges, and a series of fastening devices located at intervals along the rib and each provided with heads adapted to extend across the lateral flanges and with tongues cut from the body of the heads and turned inwardly and provided with barbs for snap fastening engagement with the edges of the lateral flanges.

4. The combination with a wall member of a channel-shaped rib secured thereto and having oppositely projecting flanges, insulation within the channel and beyond the flanges, and clamping members, the intermediate portion of which engages the insulation in the channel and the extreme portion of which engages the insulation beyond the flanges, said fastener having inwardly projecting tongues provided with diverted lugs to engage the edges of the flanges.

5. A wall construction comprising a wall member, a continuous channel-shaped rib secured to the wall member and having its projecting portions turned outwardly to provide lateral flanges, a strip of insulating material within the channel, layers of insulating material respectively beyond the outer edges of the lateral flanges, and a series of retaining devices each provided with an intermediate portion formed to engage said strip and with heads at opposite ends of the intermediate portion adapted to extend across the lateral flanges and bear against said layers, and tongues projecting inwardly from the heads and having shoulders for snap fastening engagement with the edges of the lateral flanges.

6. A fastener comprising a strip with longitudinally bowed head portions and an intermediate connecting portion, shank members comprising sheet metal tongues formed from cuts extending longitudinally of the strip and attached thereto at their ends distant from the intermediate portion and bent to project therefrom in spaced relation to the ends of the fastener body to define end abutments on said head portions, and a securing element projecting out of the plane of at least one of said shank members defining a shoulder adapted for fastening engagement with a cooperating part.

7. A fastener of the character described comprising a single strip of sheet metal providing an intermediate portion and two longitudinal outwardly bowed head portions, tongues formed from the head portions by longitudinal cuts and bent inwardly while attached thereto at their ends distant from the intermediate portion, and projecting barbs formed of the material of the tongues.

8. A fastener of the character described comprising a single strip of metal having an intermediate portion and two longitudinally bowed head portions, a tongue formed from the body of each head portion by cuts extending longitudinally of the strip and bent inwardly therefrom being joined to the head portion adjacent the outer end thereof, each tongue being formed with a barb cut from it and bent inwardly beneath the opening in the head left by the tongue, whereby the barbed tongues may have snap fastener engagement with lateral flanges on a retaining member behind the fastener.

GEORGE A. TINNERMAN.
GEORGE A. HANSMAN.